Jan. 13, 1970   R. P. ANNEN   3,489,353
VARIABLE GEOMETRY ROCKET NOZZLE
Filed Sept. 21, 1967   2 Sheets-Sheet 1

INVENTOR
ROBERT P. ANNEN

BY
ATTORNEY 3,489,353
VARIABLE GEOMETRY ROCKET NOZZLE
Robert P. Annen, Madison, Wis., assignor, by mesne assignments, to the United States of America as represented by the Secretary of the Navy
Filed Sept. 21, 1967, Ser. No. 669,658
Int. Cl. B64c 15/06; B05b 1/00
U.S. Cl. 239—265.43  8 Claims

ABSTRACT OF THE DISCLOSURE

A variable geometry rocket nozzle which is formed on a movable wire form, the material covering this form being a mixture of tungsten particles in a silica matrix, which above a threshold stress behaves as a Newtonian liquid, undergoing continuous deformation, while at a temperature below a threshold stress, it responds to a load as does a Hookian solid. The threshold stress may be defined as the critical point in straining of a material where there is a change of state.

BACKGROUND OF INVENTION

Field of invention

This invention relates to rocket propulsion and, more particularly, to the design and composition of the nozzle forming the exhaust for rocket motors.

Description of the prior art

In the field of nozzles for rocket motors, there is great difficulty in finding a nozzle which will withstand the high temperatures found at the exhaust of the rocket motors. These high temperatures change the nature of the material used for the nozzles. The present nozzles are subject to extreme wear and a consequent loss of function at these high temperatures which are extremely detrimental to the proper function of the rocket. Ablation of critical areas of the nozzle occurs, loss of directional control and loss of general efficiency of the nozzle, when present day nozzles are subjected to the high temperatures at which the rocket motors operate. It has not been possible to compensate for wear while the nozzle is in operation, nor in any way to correct the form of the nozzle while in flight.

SUMMARY OF THE INVENTION

The material which forms the covering for the nozzle is a composite material having unusual properties at high temperatures. It is made up of tungsten particles in a silica matrix and behaves as a Bingham type liquid, i.e., below a certain threshold stress, the material responds to load as does a Hookian solid (stress linearly proportional to strain). Above the threshold stress, the material behaves as a Newtonian liquid and undergoes continuous deformation or strain as long as the load is applied. When the stress level is lowered below the threshold stress, the material again behaves as a Hookian solid. This threshold stress level may be varied by changing the nature of the tungsten additives. The threshold stress is that point where a material changes its state due to the proportion of stress to strain, under load. It is determined by temperature and pressure, where pressure is considered as the load on the material.

The nozzle would be fabricated by surrounding or impregnating a tungsten wire form with this composite material. This wire form would provide sufficient support, acting as a reinforcing member, so that during normal nozzle operation the stress levels in the silica tungsten mixture would be well below the threshold value. The form could then be caused to move by applying external forces above the threshold value, thus causing the entire nozzle to change shape. After these external forces were removed, the nozzle would maintain its new geometry.

The object of the present invention is to provide a rocket nozzle which can be made to vary its geometry.

Another object of the present invention is to provide a rocket nozzle which, while operating, may be changed in its geometrical shape to vary the diameter, length or other dimension to produce optimum conditions of exhaust at that particular instant.

Another object of the present invention is to provide a nozzle for a rocket motor which can be altered in its geometrical shape, while in operation to compensate for wear.

A further object of the present invention is to provide a rocket nozzle constructed on a movable wire frame which may be adjusted to change its length or its diameter and to provide a visco-elastic covering for this frame which will conform to the frame before, during and after said dimensional changes.

It is a still further object of the present invention to provide a nozzle for a rocket motor made of a material which is a mixture of tungsten particles in a silica matrix and which behaves as a Bingham type liquid, i.e., above a certain stress the material behaves as a Newtonian liquid, while below that stress, it behaves as a Hookian solid (stress linearly proportional to strain).

It is a still further object of the present invention to provide a rocket nozzle made of a material formed over a movable wire frame, which will conform to the frame and which will stand up under the high temperatures to which it is subjected.

Other objects, advantages and novel features of the present invention will become apparent from the following detailed description of the invention when considered in conjunction with the accompanying drawings.

DESCRIPTION OF THE PREFERRED EMBODIMENTS

Figure 1:
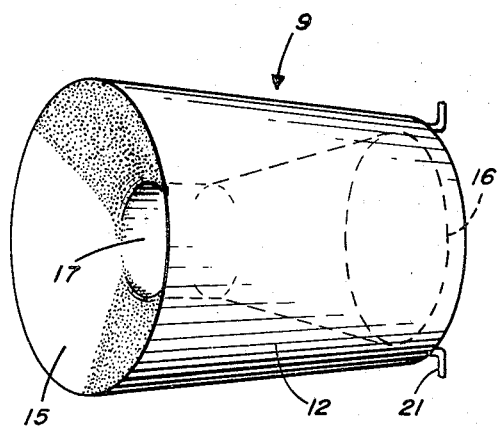
FIG. 1 is a perspective view of the nozzle.

Referring now to the drawings in which like parts are designated by like numbers throughout the several figures, the nozzle 9 is formed of a wire frame 11 covered by a composite material 12.

Figure 2:
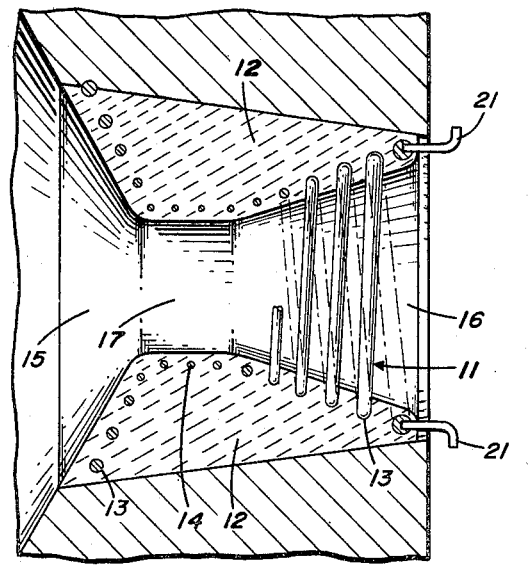
FIG. 2 is a longitudinal sectional view showing the nozzle in its middle position.
Figure 3:
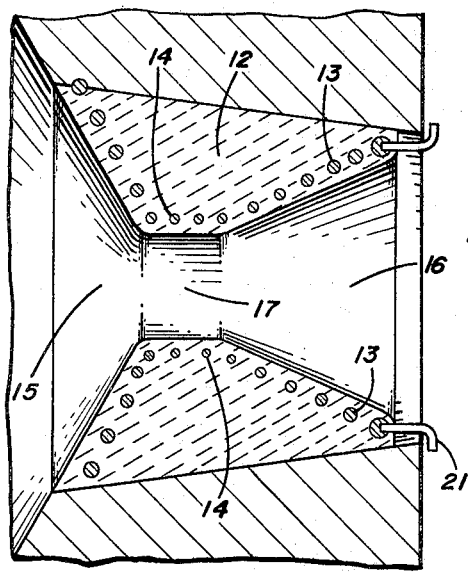
FIG. 3 is a view similar to FIG. 2 with the nozzle in one extreme position.
Figure 4:
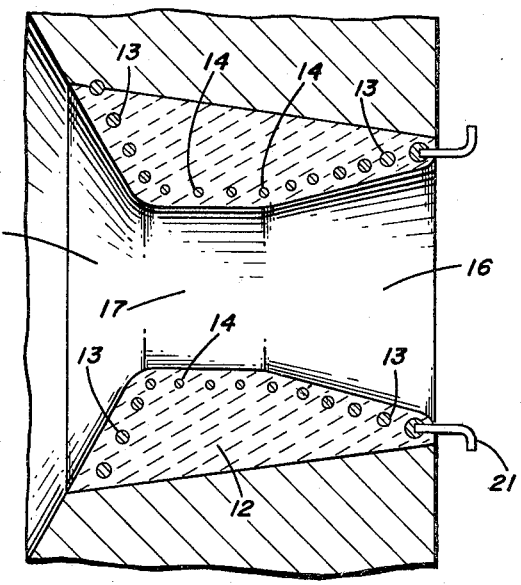
FIG. 4 is another similar view to FIG. 2 with the nozzle in the other extreme position.

The wire frame is formed of tungsten wire having different diameters throughout its length as seen at 13 showing a large diameter and at 14 showing a smaller diameter. This diameter varies in accordance with the requirements for distortion of the frame. The wire frame is in the form of a coiled spring having a large diameter end 15 and a smaller diameter end 16 with a reduced throat portion 17 between the ends. The heavy diameter rings at the ends are partially rotated to vary the extent and diameter of the throat 17 as shown in the FIGS. 2, 3 and 4. FIG. 2 shows the throat 17 in a mid position. FIG. 3 shows the frame contracted to its shorter limit while FIG. 4 illustrates the frame extended to its limit giving greater diameter and length to the throat.

The frame is covered with the composite material 12 which below the threshold stress behaves as a solid while above the threshold stress behaves as a liquid. It conforms to the shape of the frame regardless of the changes made and retains and maintains the shape after falling below the threshold stress. This stress is controlled both by the temperature and the forces applied to the frame through the actuator wires or rods 21, which can be manipulated to rotate, move along the longitudinal axis of the nozzle or twist the ends to distort the frame and vary the direction of the discharge.

Figure 5:
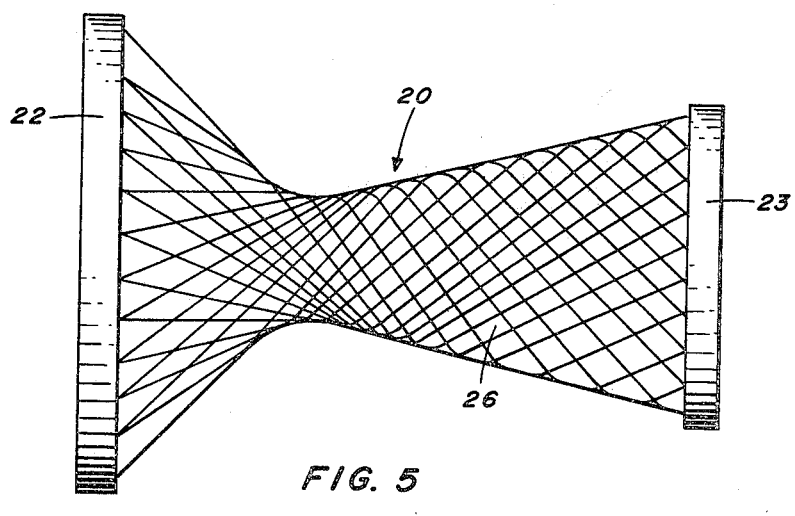
FIG. 5 shows a wire frame of different form from that of FIGS. 2, 3 and 4.
Figure 6:
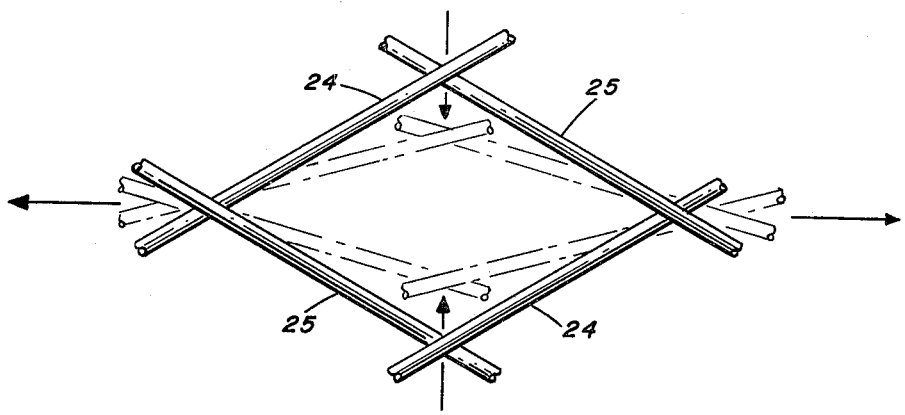
FIG. 6 is a detail of the wire frame shown in FIG. 5 showing the change in the diameter of the nozzle due to a rotation of the ends of the frame.

A different form of wire frame is shown in FIG. 5 where the frame 20 has two rings, a larger ring 22 and a smaller ring 23. Attached to these rings wires 24 and 25 are arranged in spiral formation. It will be easily seen that rotation of either of the rings will vary the length of the nozzle and the diameter of the throat portion 26. FIG. 6 is an enlarged view of the wires of the frame 20. As indicated by the arrows, outward movement along one diagonal of the parallelogram produces an inward movement along the other and vice versa. Thus movement of the end rings together causes the diameter of the form to increase while moving them apart causes it to decrease. The composite matrix would move with this form. This nature of the material may be expressed as having a visco-elastic behavior under stress.

What is claimed is:
1. A nozzle for a rocket motor comprising
   a flexible double cone-shaped frame means capable of changing its longitudinal dimension and its smallest diameter intermediate its ends;
   means attached to the frame to be operated to change the geometry of the frame; and
   a visco-elastic covering over the frame.
2. A nozzle for a rocket motor according to claim 1 wherein the frame means is made of wire in the form of a coil.
3. A nozzle for a rocket motor according to claim 1 wherein the visco-elastic covering behaves as a Bingham type liquid.
4. A nozzle for a rocket motor according to claim 1 wherein the visco-elastic covering is of a material having a threshold stress value above which it performs as a Newtonian liquid and below which it performs as a Hookian solid.
5. A nozzle for a rocket motor according to claim 1 wherein the visco-elastic covering is a composite material formed of tungsten particles in a silica matrix.
6. A nozzle for a rocket motor according to claim 1 wherein the frame means is formed of wire having a varied diameter throughout its length.
7. A nozzle for a rocket motor according to claim 1 wherein the frame means is formed of a smaller end ring and a larger end ring with wires connecting said rings in opposite spiral formation.
8. A nozzle for a rocket motor according to claim 7 wherein the means for changing the geometry of the frame is directed to rotation of either of the end rings.

References Cited

UNITED STATES PATENTS

| | | |
|---|---|---|
| 2,569,996 | 10/1951 | Kollsman. |
| 3,231,197 | 1/1966 | Strom _____ 239—265.39 X |
| 3,329,390 | 7/1967 | Hulsey _____ 251—4 |
| 2,909,032 | 10/1959 | Davies _____ 60—253 |
| 2,912,820 | 11/1959 | Whitmore _____ 60—225 |

M. HENSON WOOD, Jr., Primary Examiner

MICHAEL Y. MAR, Assistant Examiner

U.S. Cl. X.R.

251—4; 60—253; 239—602